(12) United States Patent
Ognibene

(10) Patent No.: US 8,125,327 B2
(45) Date of Patent: Feb. 28, 2012

(54) METHOD FOR INCREASING VEHICLE BRAKE/SAFETY/HAZARD LIGHT VISIBILITY

(75) Inventor: Edward J. Ognibene, Belmont, MA (US)

(73) Assignee: Edward J. Ognibene, Belmont, MA (US)

( * ) Notice: Subject to any disclaimer, the term of this patent is extended or adjusted under 35 U.S.C. 154(b) by 427 days.

(21) Appl. No.: 12/283,310

(22) Filed: Sep. 11, 2008

(65) Prior Publication Data

US 2010/0060446 A1    Mar. 11, 2010

(51) Int. Cl.
*B60Q 1/50*    (2006.01)
(52) U.S. Cl. .......................... 340/479; 340/467; 340/469
(58) Field of Classification Search .................. 340/463, 340/464, 467, 468, 469, 471, 472, 479; 362/474, 362/488, 490, 551; 428/690
See application file for complete search history.

(56) References Cited

U.S. PATENT DOCUMENTS

| | | |
|---|---|---|
| 3,320,586 A | 5/1967 | Wagner |
| 3,440,603 A | 4/1969 | Cochran |
| 3,665,391 A | 5/1972 | Bumpous |
| 3,748,643 A * | 7/1973 | Jacobs ........................... 340/467 |
| 4,667,177 A | 5/1987 | Athalye |
| 5,089,805 A | 2/1992 | Salsman |
| 5,481,243 A * | 1/1996 | Lurie et al. ..................... 340/467 |
| 5,499,011 A | 3/1996 | Young |
| 7,213,952 B2 * | 5/2007 | Iwai ............................... 362/488 |
| 7,287,886 B2 * | 10/2007 | Iwai ............................... 362/490 |
| 7,723,740 B2 * | 5/2010 | Takashima et al. ............. 257/98 |
| 2004/0137265 A1 * | 7/2004 | Shimada et al. ............... 428/690 |

FOREIGN PATENT DOCUMENTS

WO    WO 2004/078885    9/2004

OTHER PUBLICATIONS

Russian Office Action dated Mar. 9, 2010.

* cited by examiner

*Primary Examiner* — Van T. Trieu

(57) ABSTRACT

Vehicle brake lights, hazard lights, bicycle lights, and safety lights for pedestrians, walkers, and runners. The human eye perceives light differently depending on its frequency (or wavelength) relative to the condition or degree of ambient lighting. Moreover, the human visual system perceives changes more readily than a static scene or state. Additionally, light in the green/blue part of the visual spectrum is perceived with much greater apparent intensity compared to red, particularly in low ambient light conditions. Accordingly, a lighting system and method that includes using brake lights that provide continuous changes in color during deceleration and, moreover, that uses blue, green, blue-green, yellow-green, and amber (or yellow) light or combinations thereof.

19 Claims, 2 Drawing Sheets

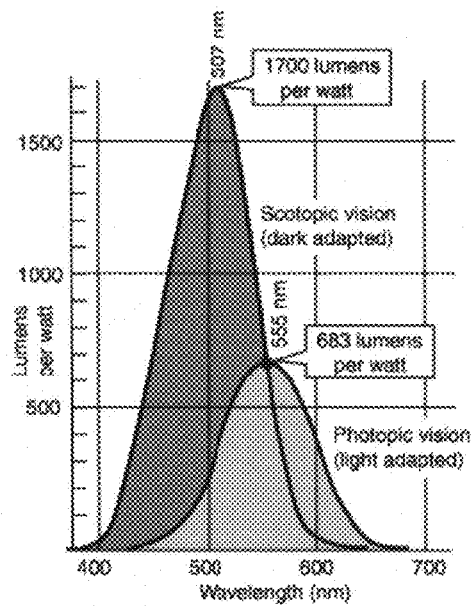
FIG. 3
FIG. 4
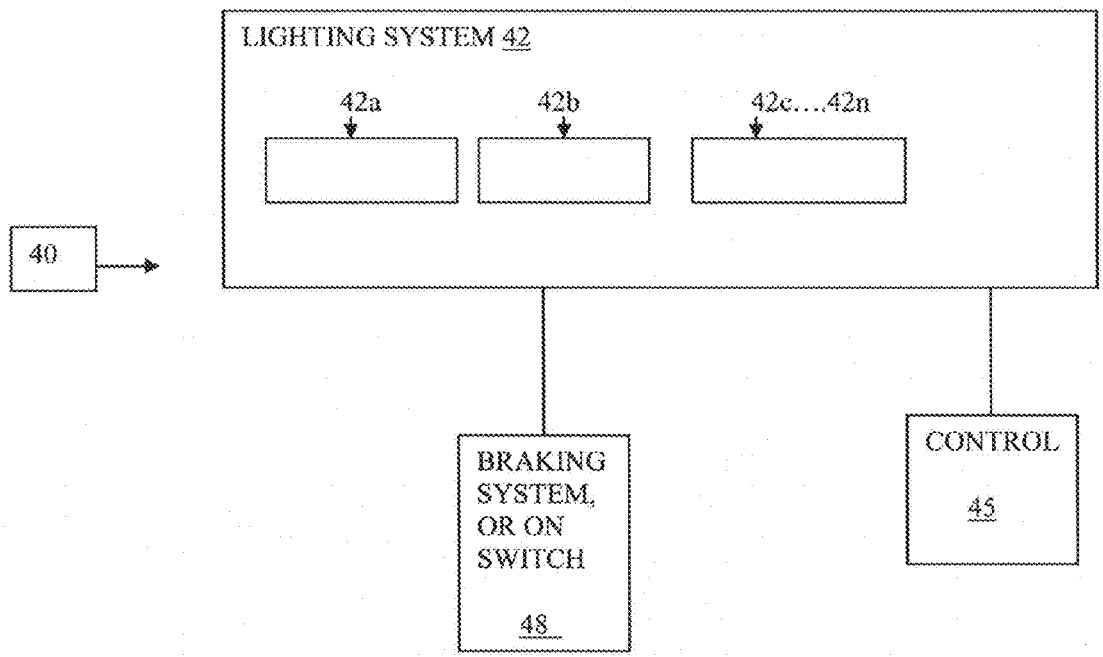

METHOD FOR INCREASING VEHICLE BRAKE/SAFETY/HAZARD LIGHT VISIBILITY

BACKGROUND OF THE INVENTION

The present invention provides a system and method of increasing the visibility of vehicle brake lights, hazard lights, and safety lights for various applications and more particularly, a system and method of increasing the visibility of vehicle brake lights, hazard lights, and safety lights using continuously changing colored lights especially specific/particular light colors (or frequencies) that are perceived by the human eye with much greater apparent intensity.

Conventionally, different colored lights, variable intensity red light, or flashing lights have been conceived for use in vehicle brake-light systems to denote different levels of deceleration. For example, U.S. Pat. No. 6,943,677 to Boyer, et al. discloses a method for changing the intensity, i.e., brightening and/or dimming, of the tail lights of a motor vehicle, which includes a flashing-state that occurs when the brakes are first applied. U.S. Pat. No. 4,667,177 to Athalye discloses a system that uses different colors to denote different degrees of deceleration. A first color, e.g., red, denotes braking; a second color, e.g., yellow, denotes mild deceleration; and a third color, e.g., blue, indicates a more extreme or rapid deceleration. U.S. Pat. No. 3,320,586 to Wagner also discloses using different colors to denote different operational states. For example, a first color can denote constant velocity, another can denote acceleration, and yet another can denote deceleration.

In U.S. Pat. No. 3,665,391 to Bumpous, audible and visual indications for controlling and presaging different states, i.e., acceleration, deceleration, etc., are disclosed. In U.S. Pat. No. 5,089,805 to Salsman, the use of different intensity light having a common color (red) to indicate different levels of deceleration is disclosed. Lower intensity denotes less deceleration and higher intensity indicates more intense or rapid deceleration. Finally, U.S. Pat. No. 5,499,011 to Young discloses a method that equates deceleration braking intensity to the extent of lighting. For example, with slow to moderate deceleration, a relative few number of lights or lighting elements are illuminated but with more rapid or extreme deceleration, more lights or lighting elements are illuminated.

BRIEF SUMMARY OF THE INVENTION

Methods and systems for increasing the visibility of vehicle brake lights, hazard lights, and safety lights for various applications are disclosed. The methods and systems use continuously changing light color to denote a braking (decelerating) state and/or a heightened state of visibility in the case of hazard and safety lights. Additionally, use of light colors in the visible light spectrum that are perceived by the human eye with much greater sensitivity/apparent intensity in low ambient light conditions is disclosed.

For example, green, blue and yellow/amber are some of the light colors that are perceived by the human eye with much greater apparent intensity. Furthermore, changing light colors creates a state of heightened awareness. For example, changing light color from red to amber to blue to green and so forth (repeating periodically or randomly) can be used to denote deceleration and/or also to promote increased visibility (heightened awareness) in the case of hazard and safety lights.

BRIEF DESCRIPTION OF THE DRAWINGS

The invention will be better understood by reference to the following more detailed description and accompanying figures in which:

FIG. 3 shows the spectral luminous efficacy for human vision for day and dusk/night, showing light-adapted and dark-adapted vision; and FIG. 4 shows a block diagram of a lighting system in accordance with the present invention.

DETAILED DESCRIPTION OF THE INVENTION

The human eye, or, more specifically, human visual perception, is tuned to notice and detect change. Change can manifest as movement, spatial or temporal dynamics, variations in light intensity, changes in light color, and any combination thereof. As a result, light that continuously changes color is more visible and more easily perceived than light that illuminates in a single, fixed color or frequency.

The human eye also perceives light differently as a function of the frequency (or wavelength) of the light, which is to say, its color. Moreover, perceived light sensitivity changes as a function of ambient lighting. Indeed, in low ambient lighting conditions, the human eye is more sensitive to relatively higher frequency (or shorter wavelength) light such as blue and/or green light than to relatively lower frequency (or longer wavelength) light such as red light. Even in brighter ambient light conditions, green light is perceived much more readily by the human eye, which is to say with greater apparent intensity, than other colors in the visible spectrum.

Figure 1:
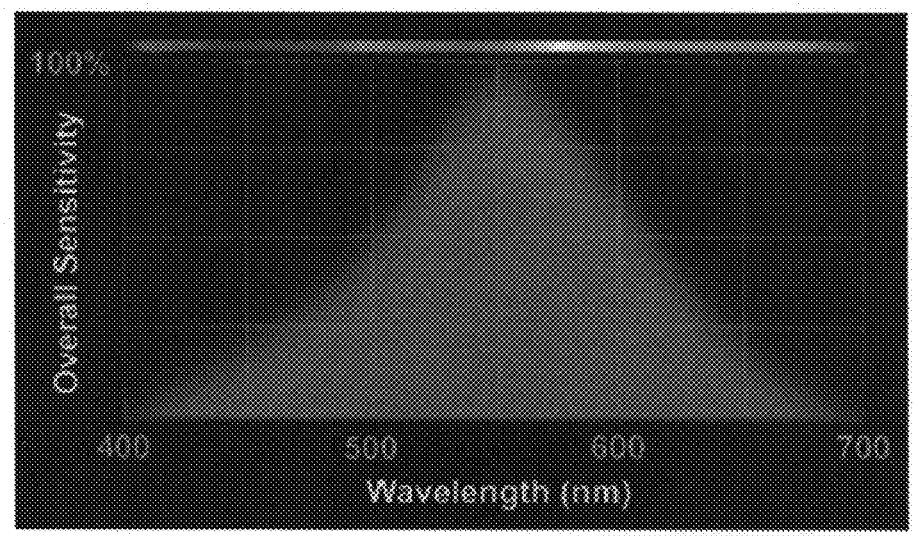
FIG. 1 shows the spectral sensitivity of the rods and cones which comprise the human optical receptors.

This phenomenon is due, in large part, to photoreceptor cells located in the retina of the human eye. Rod cells, or rods, function in less intense light or in conditions of low ambient lighting. Referring to FIG. 1, the spectral sensitivity of rods and cones is shown. The wavelength varies from higher frequency, ultraviolet light (400 nm) to lower frequency, infrared light (700 nm). The spectral sensitivity in FIG. 1 peaks at yellow-green (550 nm).

However, for one reason or another, rods share the same spectral selectivity characteristics. Accordingly, at very low illumination levels, rods cannot create a color image. Indeed, at very low illumination levels, rods cannot distinguish a specific color, e.g., red light, but rather only observe a contrast between black and white.

Figure 2:
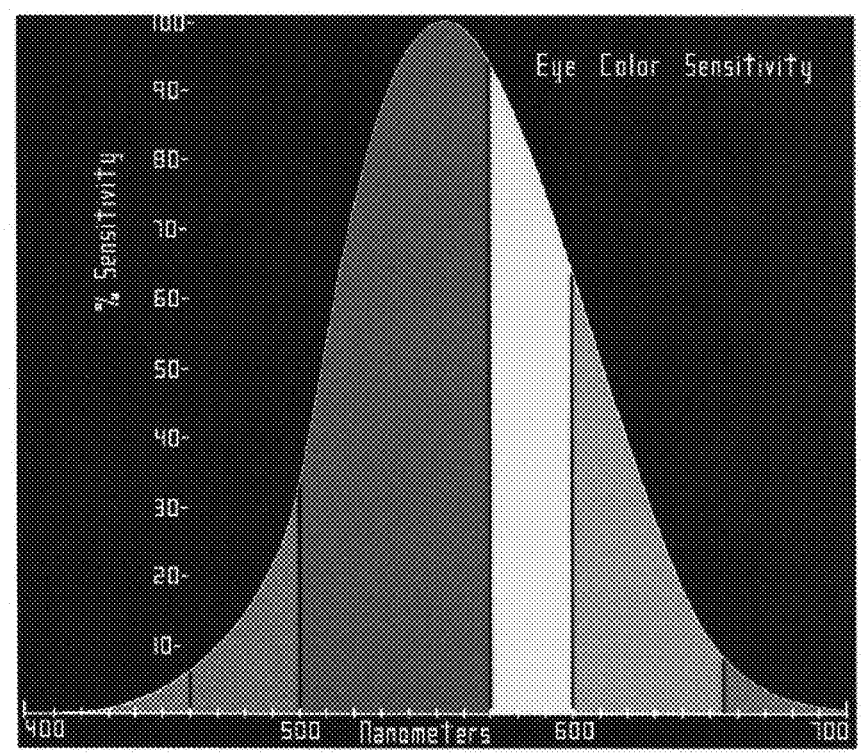
FIG. 2 shows color sensitivity and perception (apparent intensity) of the human eye, a complimentary representation of what is shown in FIG. 1.

The human eye has three types of color sensitive cone cells, or cones, which include cones that are sensitive to "blue" (violet) light, cones that are sensitive to "green" (cyan) light, and cones that are sensitive to "red" (magenta) light. Only through cone types combining in different relative proportions, are light intensities and colors perceived. This is shown illustratively in FIG. 1 & FIG. 2.

In contrast with rods, cones have little to no sensitivity in low ambient conditions but, rather, function better in relatively bright light. In low or decreasing ambient light conditions, cones start to shut down. Indeed, as the red-sensitive cones start shutting down (the first to do so) as ambient light decreases, there is an increased perception of blue light and green light and combinations thereof relative to red light.

The response curve of the human eye and the spectral power distribution of a luminous object determine the perceived color of the object. For example, referring to FIG. 3, the spectral luminous efficacy for human vision is shown for different ambient light conditions. The first curve 12 shows scoptic vision, which is primarily due to the light-sensitive rods in the eye with the cones functioning in a reduced capacity, while the second curve 14 shows photopic vision, which includes the cones functioning in full capacity as the primary receptors. The peaks of the scotopic 12 and the photopic curves 14 have a typical luminous efficacy of 1700 and 683 lumens/watt, respectively.

As shown in FIG. 3, the photopic curve 14 and the scotopic curve 12 overlap. Indeed, the peak 13 of the photopic curve 14 intersects the scotopic curve 12 at a wavelength of approximately 555 nanometers (nm). Thus, at a wavelength of 555 nm, the efficacy of the scotopic curve 12 and the efficacy of the photopic curve 14 are identical.

In summary, in instances of bright photopic light, the color-sensitive cone receptors predominate. In broad daylight, we see a brilliant red rose whose leaves are a more subdued green. But at twilight, as our eyes become dark-adapted, the cones begin to shutdown (red-sensitive cones first), and our vision becomes rod-dominated scotopic with cones functioning in a reduced capacity. Hence, the green leaves are seen more readily and the red of the rose less so, more dull fading eventually to shades of gray as ambient light diminishes and the cones shut down.

These principals of light and the function and sensitivity of the human eye can be applied directly to numerous applications to create more effective, higher visibility, more readily perceived, lighting systems. In particular, these principles of light and sensitivity to light in various ambient conditions can be used to provide for increased visibility of vehicle brake lights, hazard lights, and safety lights.

For example, referring to FIG. 4, a vehicle brake light system 40 can be structured and arranged to display continually changing color lights 42 when the brakes 48 are applied. This is not a proportional system wherein the lights 42 change their appearance (intensity) or color in proportion to the applied braking force or in proportion to the rate of deceleration; rather, it is a binary ON/OFF system 40 wherein a plurality of light colors 42a, 42b, and 42c (up to n different light colors) are successively displayed (repeating periodically or randomly) when the brakes 48 are engaged and/or the hazard or safety lights are switched ON. This promotes heightened awareness and visibility. Additionally, colors that are perceived by the human eye with much greater apparent intensity can be used in the lighting sequence, e.g., blue, green, and combinations thereof, resulting in further enhanced visibility.

There are numerous methods for producing light that changes color sequentially, randomly, and/or temporally. One method is by using three primary color (red, green, blue) light elements 42 (e.g., light bulbs, light-emitting diodes, pixels, and the like) in the brake light 40, and, optionally, further illuminating each light element 42 with an intensity that varies as a function of time. In doing so, any color 42a, 42b, and 42c, in the visible light spectrum can be created.

The system 40 includes a control circuit 45 that can be adapted to temporally alter the intensity of the plural light elements 42, to create a brake, hazard, or safety, light 42 that continually changes its perceived or transmitted color 42a, 42b, and 42c.

Advantageously, the human sensory system is conditioned to detect or notice differences or changes, e.g., sounds that stand out from the ambient background noise, tactile objects that feel different to the touch, or optical events in one's field of vision that noticeably changes.

Hence, light that is constantly changing color would be highly visible and more noticeable compared to light having a discrete color and/or constant frequency. Furthermore, under night-driving (or low ambient light) conditions the effect would be even more dramatic as the change from red, corresponding to the traditional motor vehicle tail light, to a mode of continually changing color (periodically or randomly), would be highly noticeable and perceived more readily.

In addition to using changing colors 42a, 42b, and 42c as a means to promote increased visibility, the system 40 uses specific colors of the visible light spectrum that are perceived more readily and with greater apparent intensity by the human eye. For example, green light is perceived with much greater apparent intensity by the human eye. Moreover, during daylight conditions of photopic vision, green light is perceived by cone receptor cells with the greatest spectral intensity while during low-ambient light conditions of scotopic vision, as green and red cones begin to shut down, rod receptor cells and the blue-sensitive cones perceive blue light with higher luminous efficiency than other colors. Accordingly, during daylight and periods of low-ambient light conditions, green/yellow and blue light is considerably more visible than red light. Consequently, by including lighting devices 42 that emit these colors, which typically have a wavelength of 450-600 nm, in the lighting scheme/system 40, visibility and detectability can be considerably increased.

Although the invention has been described in connection with motor vehicle (e.g., car, truck, motorcycle, etc.) brake lights, application of the invention is not to be construed as being confined thereto. For example, the disclosed lighting system/scheme can be used in connection with "hazard" lights, which can take advantage of these methods of increased visibility as well, application to bicycle tail lights, safety lighting for pedestrians, walkers, joggers, and rollerbladers.

It will be apparent to those skilled in the art that modifications to, and variations of, the disclosed methods and apparatus are possible without departing from the inventive concepts disclosed herein, and therefore the invention should not be viewed as limited except to the full scope and spirit of the appended claims.

What I claim is:

1. A brake lighting system for denoting a decelerating change in state of an object resulting from application of a braking system, the system comprising:
    a lighting device that is structured and arranged to continuously change color upon and during application of the braking system;
    a control system that continuously changes the color (repeating periodically or randomly) of the lighting system upon initiation of the braking system and during a braking event.

2. The system as recited in claim 1, wherein the object is selected from the group comprising a motor vehicle, a trailer pulled by a motor vehicle, a boat, water craft, a train, a car pulled by a train, a bicycle, a moped, an all-terrain vehicle, a snow mobile, and a motorcycle.

3. The system as recited in claim 1, wherein the lighting device is selected from the group comprising a plurality of light bulbs that emit light at a different wavelength, a plurality of light bulbs that emit light at a common wavelength that are covered by filters or lenses of different colors, an array of light emitting diodes that emit light at a different wavelength, and an array of light emitting diodes that emit light at a common wavelength that are covered by filters of lenses of different colors.

4. The system as recited in claim 1, wherein the change in color of the lighting device includes a change to at least one of blue. light, yellow-green light, blue-green light, and green light and combinations thereof.

5. The system as recited in claim 1, wherein the change in color of the lighting device includes a change to a light having a wavelength between approximately 450 nm and approximately 700 nm.

6. The system as recited in claim 1, wherein the change in color of the lighting device includes a change in intensity of said lighting device.

7. The system as recited in claim 1, Wherein the lighting device emits light that continuously changes frequency from a first frequency to a second, different frequency upon application of and during the braking system.

8. The system as recited in claim 1, wherein the lighting device emits light that continuously changes color from a first color to a second, different color upon and during application of the braking system.

9. A safety or hazard lighting system for providing an alert of a hazard or presence of a pedestrian or cyclist, the system comprising:
   a lighting device that is structured and arranged to continuously change color when switched "on";
   a control system that continuously changes the color (repeating periodically or randomly) of the lighting system when hazard or safely light is switched on.

10. The system as recited in claim 9, wherein the lighting device is selected from the group comprising a plurality of light bulbs that emit light at a different wavelength, a plurality of light bulbs that emit light at a common wavelength that are covered by filters or lenses of different colors, an array of light emitting diodes that emit light at a different wavelength, and an array of light emitting diodes that emit light at a common wavelength that are covered by filters of lenses of different colors.

11. The system as recited in claim 9, wherein the change in color of the lighting device includes a change to at least one of blue light, blue-green light, yellow-green-light, yellow light, green light, and combinations thereof.

12. The system as recited in claim 9, wherein the change in color of the lighting device includes a change to a light having a wavelength between approximately 450 nm and approximately 700 nm.

13. The system as recited in claim 9, wherein the change in color of the lighting device includes a change in at least one of intensity and frequency of said lighting device.

14. A method of denoting a decelerating change in state of an object resulting from application of a braking system or presence of a pedestrian, cyclist or hazard using the system as recited in claim 1, the method comprising:
   continuously changing a color (repeating periodically or randomly) of light emitted by a lighting device upon and during application of the braking system or upon activation of a hazard or safety light.

15. The method as recited in claim 14, wherein the object is selected from the group comprising a motor vehicle, a trailer pulled by a motor vehicle, a train, a boat, water craft, a car pulled by a train, a bicycle, a moped, an all-terrain vehicle, a snow mobile, and a motorcycle.

16. The method as recited in claim 14, wherein the lighting device is selected from the group comprising a plurality of light bulbs that emit light at a different wavelength, a plurality of light bulbs that emit light at a common wavelength that are covered by filters or lenses of different colors, an array of light emitting diodes that emit light at a different wavelength, and an array of light emitting diodes that emit light at a common wavelength that are covered by filters or lenses of different colors.

17. The method as recited in claim 14, wherein continuously changing the color of the lighting device includes continuously changing the color to at least one of blue light, blue-green light, yellow-green light, yellow light, green light, and combinations thereof.

18. The method as recited in claim 14, wherein continuously changing the color of the lighting device includes continuously changing the color to that of light having a wavelength between approximately 450 nm and approximately 700 nm.

19. The method as recited in claim 14, further comprising changing an intensity of said lighting device.

* * * * *